United States Patent
Sonoda

(10) Patent No.: US 10,695,905 B2
(45) Date of Patent: Jun. 30, 2020

(54) ROBOT CONTROL APPARATUS AND ROBOT CONTROL METHOD

(71) Applicant: CANON KABUSHIKI KAISHA, Tokyo (JP)

(72) Inventor: Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 15/298,983

(22) Filed: Oct. 20, 2016

(65) Prior Publication Data
US 2017/0129101 A1    May 11, 2017

(30) Foreign Application Priority Data

Nov. 6, 2015   (JP) ................................. 2015-218215

(51) Int. Cl.
| | | |
|---|---|---|
| *G06T 1/00* | (2006.01) | |
| *B25J 9/16* | (2006.01) | |
| *B25J 9/00* | (2006.01) | |
| *B65G 47/90* | (2006.01) | |

(52) U.S. Cl.
CPC ........... *B25J 9/1612* (2013.01); *B25J 9/0093* (2013.01); *B25J 9/1687* (2013.01); *B25J 9/1697* (2013.01); *B65G 47/905* (2013.01); *G05B 2219/39102* (2013.01); *G05B 2219/40053* (2013.01); *G05B 2219/40555* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0012198 A1* | 1/2006 | Hager | ................... | B25J 9/1612 294/106 |
| 2008/0133058 A1* | 6/2008 | Ohno | ..................... | B25J 9/1612 700/259 |
| 2008/0240889 A1* | 10/2008 | Yokoyama | ............. | B25J 9/1612 414/1 |
| 2013/0184870 A1* | 7/2013 | Ota | ........................ | B25J 9/1669 700/262 |
| 2013/0311154 A1* | 11/2013 | Atohira | ..................... | G06T 1/00 703/6 |
| 2013/0343640 A1* | 12/2013 | Buehler | ................. | B25J 9/0087 382/155 |
| 2014/0074291 A1* | 3/2014 | Emoto | ................... | B25J 9/1664 700/258 |

(Continued)

FOREIGN PATENT DOCUMENTS

| | | |
|---|---|---|
| CN | 101360588 A | 2/2009 |
| CN | 101842195 A | 9/2010 |

(Continued)

*Primary Examiner* — Masud Ahmed
(74) *Attorney, Agent, or Firm* — Canon U.S.A., Inc. IP Division

(57) ABSTRACT

A robot control apparatus that controls operation of a robot that grips a target object includes an acquisition unit that obtains information about a position and orientation of the target object, a selection unit that selects one of a plurality of gripping modes based on a captured image of the target object, and a generation unit that generates, based on the obtained position and orientation and the selected gripping mode, gripping operation data that defines a gripping operation of the robot.

19 Claims, 11 Drawing Sheets

(56) References Cited

U.S. PATENT DOCUMENTS

| | | | |
|---|---|---|---|
| 2014/0154036 A1* | 6/2014 | Mattern | B25J 9/1612 414/729 |
| 2016/0075031 A1* | 3/2016 | Gotou | B25J 9/1697 700/259 |
| 2016/0279791 A1* | 9/2016 | Watanabe | B25J 9/1612 |

FOREIGN PATENT DOCUMENTS

| | | |
|---|---|---|
| CN | 103678754 A | 3/2014 |
| JP | 3314890 B2 | 8/2002 |
| JP | 3805310 B2 | 8/2006 |
| KR | 10-2008-0065281 A | 7/2008 |

* cited by examiner

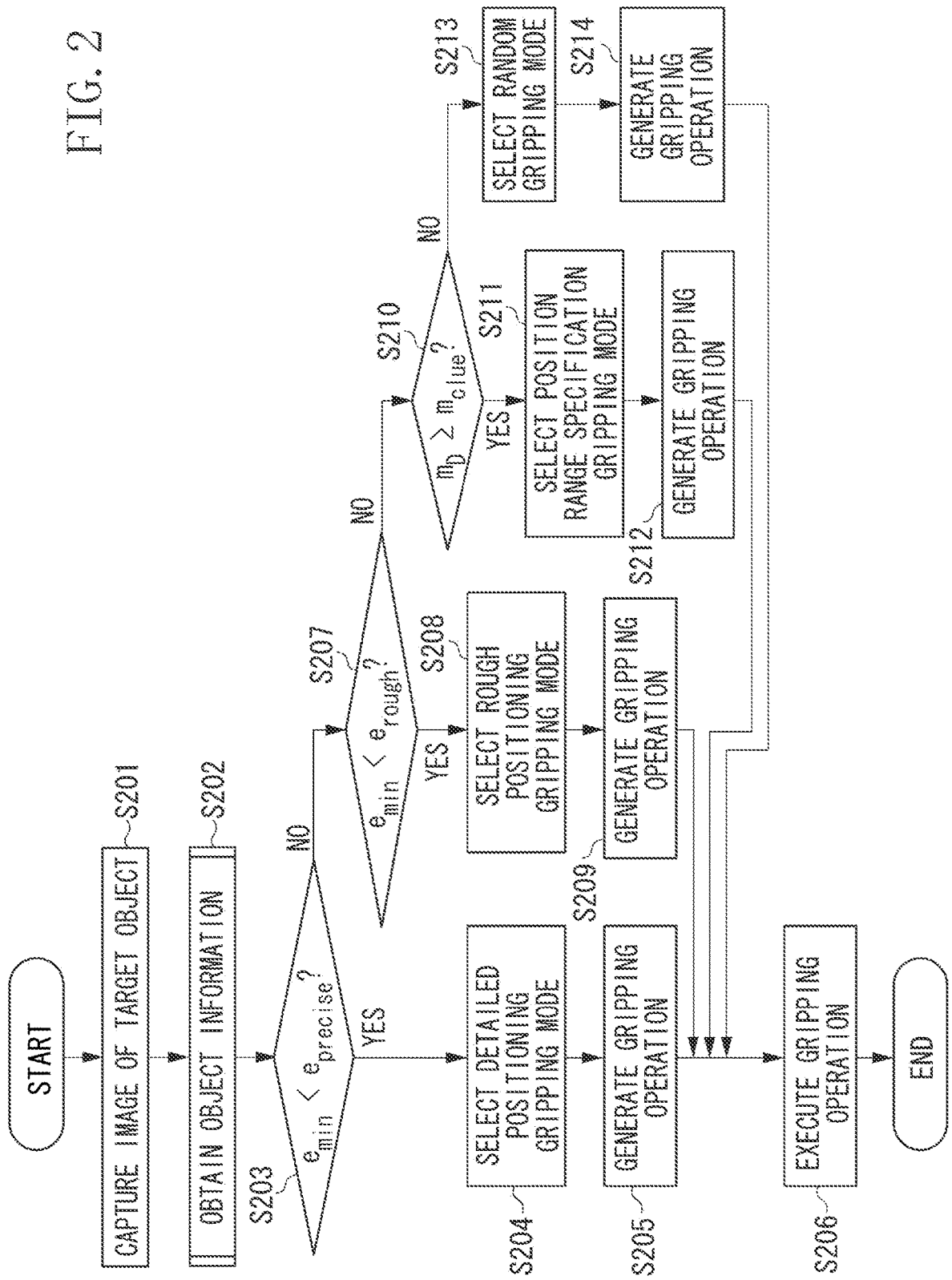

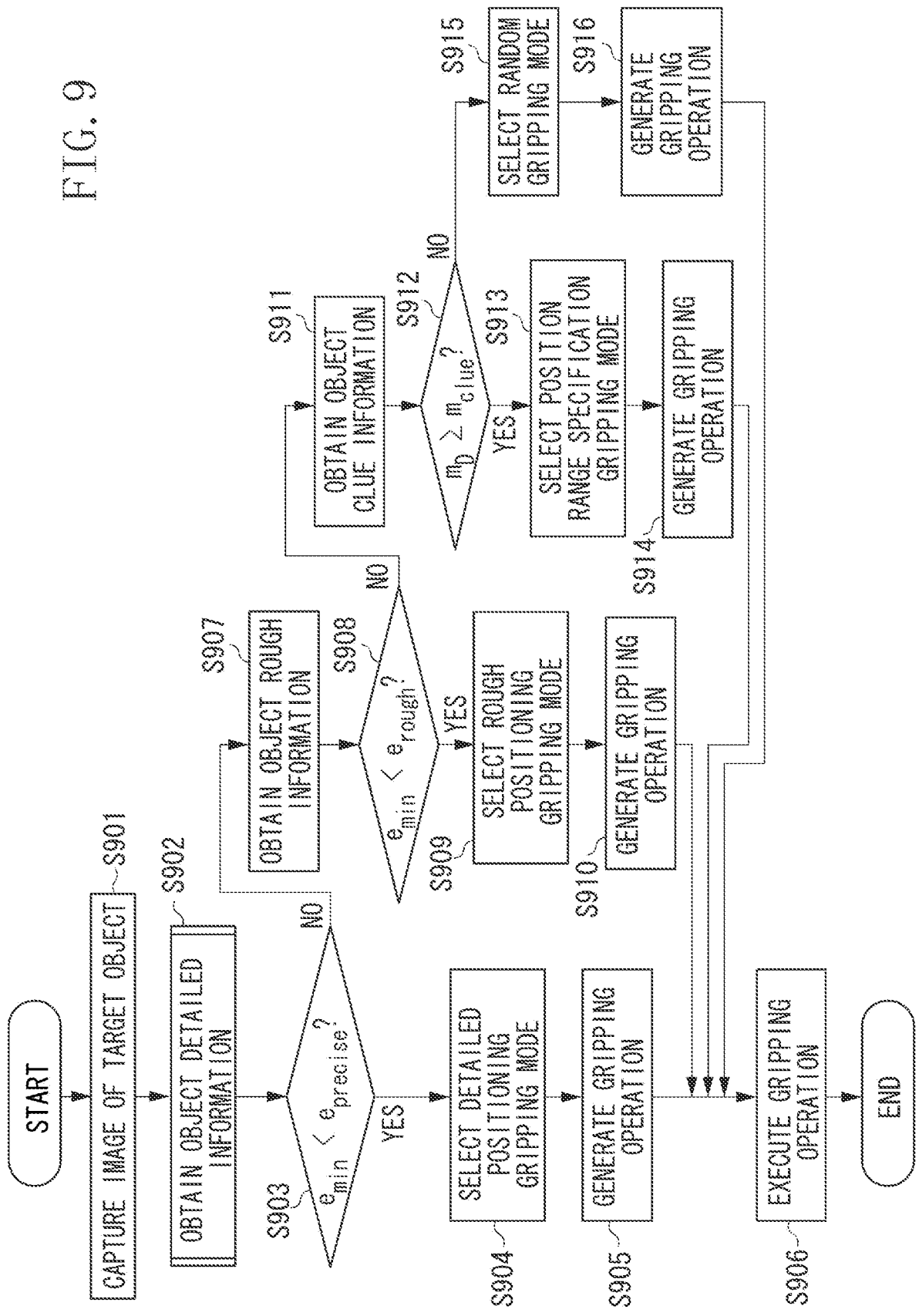

ROBOT CONTROL APPARATUS AND ROBOT CONTROL METHOD

BACKGROUND

Field

Aspects of the present disclosure generally relate to a control apparatus and a control method of a robot that grips a target object.

Description of the Related Art

In order for a robot apparatus for gripping and arranging a supplied target object in a predetermined place to accommodate varying supply states of the target object, a technique has recently been developed for recognizing and measuring a type, position, and orientation of the target object by using various sensors before gripping the target object. Japanese Patent No. 3314890 discusses a robot apparatus that obtains a video image of a target object conveyed by a belt conveyor and rotates a support member of a robot based on the video image before gripping the target object with a gripping unit. Japanese Patent No. 3805310 discusses an apparatus including a work gripping unit of which orientation can be changed according to the situation in which the target object is placed.

The apparatuses discussed in Japanese Patent No. 3314890 and Japanese Patent No. 3805310 are based on the premise that the position and orientation of the target object can be properly recognized from a captured image of the target object. The target object therefore may be unable to be gripped if the recognition of the target object is incomplete or impossible due to poor conditions such as insufficient or dim illumination, or stains on the target object. If the target object becomes unable to be gripped, i.e., the success rate of gripping drops), the work efficiency of the robot decreases.

SUMMARY OF THE INVENTION

According to an aspect of the present invention, a robot control apparatus for controlling an operation of a robot configured to grip a target object includes, an acquisition unit configured to obtain information about a position and orientation of the target object, a selection unit configured to select one of a plurality of gripping modes based on a captured image of the target object, and a generation unit configured to generate gripping operation data based on the obtained position and orientation and the selected gripping mode, wherein the gripping operation data defines a gripping operation of the robot.

According to the specification of the present application, the robot can appropriately grip the target object even if a precise position and orientation of the target object are not able to be recognized.

Further features will become apparent from the following description of exemplary embodiments with reference to the attached drawings.

BRIEF DESCRIPTION OF THE DRAWINGS

FIG. 2 is a flowchart illustrating an operation of the robot control apparatus according to the first exemplary embodiment.

FIG. 9 is a flowchart illustrating an operation of a robot control apparatus according to a second exemplary embodiment.

DESCRIPTION OF THE EMBODIMENTS

Exemplary embodiments for implementing the invention will be described in detail below with reference to the accompanying drawings. The following exemplary embodiments are just a few examples of implementing the invention. Changes and modifications can be made thereto as appropriate depending on a configuration of an apparatus and system to which the exemplary embodiments are applied, and various conditions. The following exemplary embodiments are not seen to be limiting.

A robot system that obtains object information about a target object by using an a captured image of the target object captured by a camera and grips the target object will be described below. In a first exemplary embodiment, the target objet is a part before or after processing. In the present exemplary embodiment, the object information is information about a position and orientation of the target object.

<Configuration of Robot System>

Figure 1A:
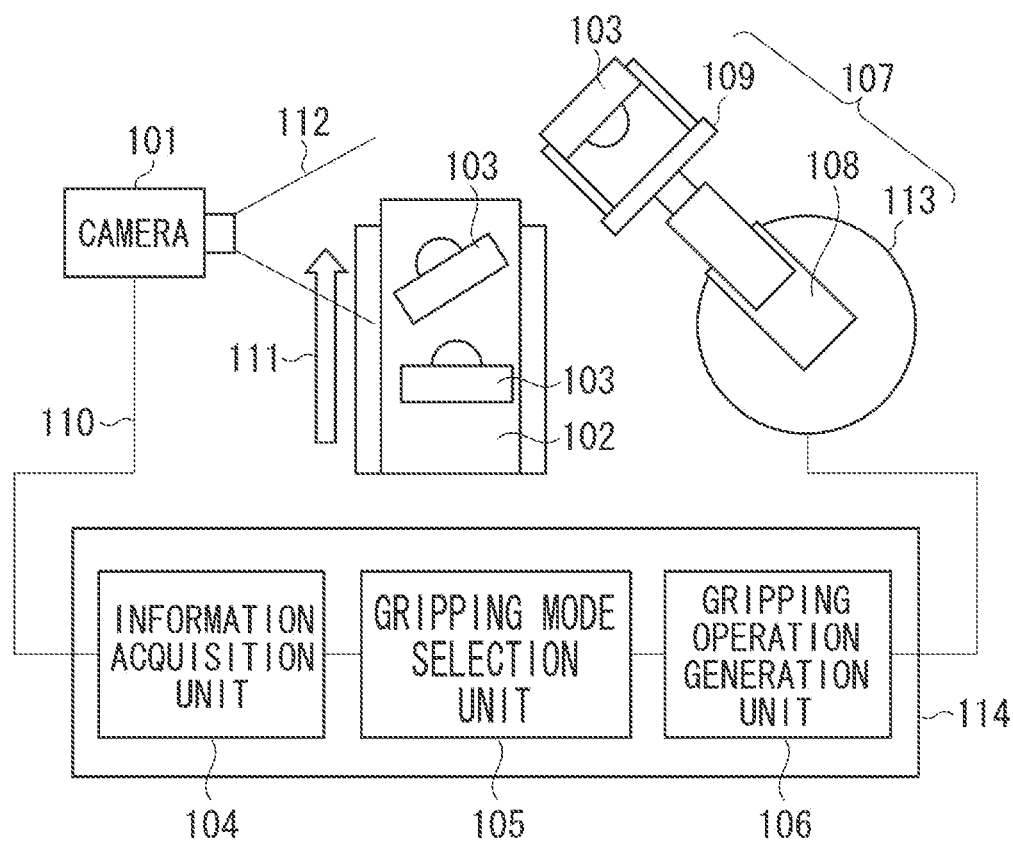
FIG. 1A is a schematic plan view illustrating a robot system including a robot control apparatus according to a first exemplary embodiment.

FIG. 1A is a view of the robot system according to the present exemplary embodiment as seen from above. A camera 101 is arranged to capture an image of a target object 103 placed on a belt conveyor 102.

The robot system includes the camera 101, an information acquisition unit 104, a gripping mode selection unit 105, a gripping operation generation unit 106, and a robot 107. The camera 101, the information acquisition unit 104, the gripping mode selection unit 105, the gripping operation generation unit 106, and the robot 107 are connected in a wired manner by a line 110. The robot 107 according to the present exemplary embodiment is a single arm robot. The belt conveyor 102 conveys a target object 103 placed thereon in the direction of an arrow 111. Since the belt conveyor 102 conveys the target object 103 and thereby supplies the target object 103 to the robot 107, the belt conveyor 102 can be referred to as a supply unit. The belt conveyor 102 can convey a plurality of target objects 103 placed thereon. When seen in a plane view, each target object 103 includes a rectangular main body and a semicircular protrusion protruding from the main body.

Figure 1B:
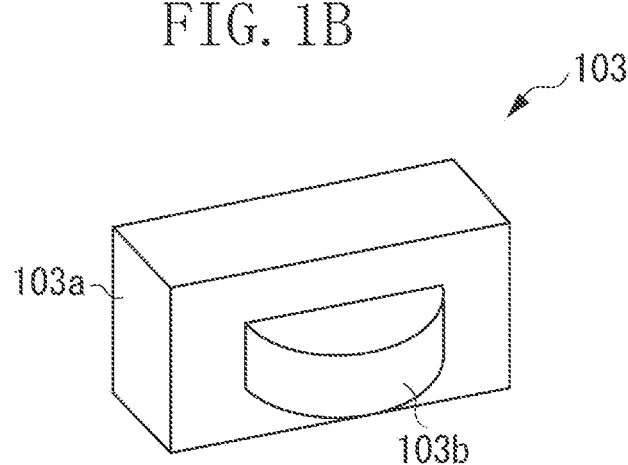
FIG. 1B is a perspective view of a target object.

FIG. 1B is a perspective view of the target object 103. FIG. 1B illustrates the target object 103 in FIG. 1A as seen in the direction opposite to the arrow 111. As described above, when seen in a plane view, the target object 103 includes a rectangular main body 103*a* and a semicircular protrusion 103*b* protruding from the main body 103*a*.

As illustrated in FIG. 1A, the camera 101 captures an image of the target object 103 supplied by the belt conveyor 102 from above to obtain a captured image of the target object 103. The camera 101 has a predetermined imaging range 112 and can capture an image of the target object 103 conveyed into the imaging range 112. For example, in the present exemplary embodiment, the captured image of the target object 103 is used to obtain a measurement value of the part (object), such as pixel-by-pixel luminance values of the target object. The camera 101 thus functions as a measurement unit of the target object 103. The luminance values of the target object 103 are an example of information related to physical property about the target object 103. A position and orientation of a robot hand 109 can be expressed in a coordinate system of the camera 101. The captured image obtained by the camera 101 is transmitted to the information acquisition unit 104. For example, the camera 101 can be a digital camera (including a video camera) including an image sensor (visual sensor) such as a charge-coupled device (CCD) image sensor and a complementary metal oxide semiconductor (CMOS) image sensor.

<Configuration of Control Apparatus>

In the exemplary embodiment illustrated in FIGS. 1A and 1B, the information acquisition unit 104, the gripping mode selection unit 105, and the gripping operation generation unit 106 constitute a robot control apparatus 114 for controlling the robot 107. The robot control apparatus 114 controls a gripping operation of the robot 107 by transmitting gripping operation data generated by the gripping operation generation unit 106 to the robot 107.

The information acquisition unit 104 obtains object information about the target object 103 by using the captured image obtained by the camera 101. In the present exemplary embodiment, the information acquisition unit 104 obtains a plurality of types of object information. The plurality of types of object information include object detailed information, object rough information, and object clue information. The information acquisition unit 104 executes processing (calculation) for obtaining the object detailed information, the object rough information, and the object clue information. The object detailed information, the object rough information, and the object clue information are set stepwise according to recognition accuracy (imaging accuracy) of the target object 103. Details of the object detailed information, the object rough information, and the object clue information will be described below.

The gripping mode selection unit 105 selects one of a plurality of gripping modes based on the captured image of the target object 103. The plurality of gripping modes corresponds to gripping precision levels of the target object 103. In the present exemplary embodiment, the gripping mode selection unit 105 selects one of four gripping modes. The four gripping modes include a detailed positioning gripping mode, a rough positioning gripping mode, a position range specification gripping mode, and a random gripping mode. The detailed positioning gripping mode is selected if detailed information about the target object 103 is successfully obtained (recognized) from the captured image of the target object 103. The rough positioning mode is selected if rough information about the target object 103 is successfully obtained from the captured image. The position range specification gripping mode is selected if information serving as a clue of the target objet 103 is successfully obtained from the captured image. The random gripping mode is selected if none of the detailed information, rough information, and clue information about the target object 103 is successfully obtained. Details of the gripping modes will be described below. The four gripping modes are set to correspond to the four levels of gripping precision of the target object 103.

The gripping operation generation unit 106 generates gripping operation data of the robot 107 for gripping the target object 103 based on the gripping mode selected by the gripping mode selection unit 105. The gripping operation data is data defining a gripping operation of the robot 107.

The robot 107 includes a robot arm 108, the robot hand 109, and a base unit 113. For example, the robot arm 108 is an articulated arm. The robot hand 109 is attached to the end of the robot arm 108. The robot hand 109 is a gripping unit (effector) for gripping the target object 103. The robot hand 109 in FIG. 1A is a standard two-fingered robot hand. The robot 107 also includes a servomotor (not illustrated) for driving the robot arm 108 and an encoder (not illustrated) for detecting an angular position of the servomotor. The robot 107 operates according to the gripping operation data (command) generated by the gripping operation generation unit 106 to grip the target object 103. The base portion of the robot arm 108 is attached to the base unit 113. The base unit 113 is a pedestal for supporting the robot arm 108.

<Processing Flow>

FIG. 2 is a flowchart illustrating an operation by which the robot 107 according to the present exemplary embodiment obtains object information about a target part (target object) and performs gripping by using the captured image of the target object 103 captured by the camera 101. An operation of the robot control apparatus 114 will be described below with reference to FIG. 2. The flowchart of FIG. 2 is started, for example, when the robot 107 is powered on.

In step S201, the camera 101 captures an image of the target object 103 from above to obtain a captured image.

In step S202, the information acquisition unit 104 obtains object information (object detailed information, object rough information, and object clue information) by using the captured image obtained in step S201. The object detailed information is information representing (identifies) a precise position and orientation of the target object 103. In other words, the object detailed information is information from which a detailed position and orientation of the target object 103 can be identified. The object rough information is information indicating a possible range of positions and orientations of the target object 103. In other words, the object rough information is information representing the position and orientation of the target object 103 with a range. The object clue information is information indicating the presence of the target object 103 in a predetermined region. In other words, the object clue information is position range information indicating the range of presence of the target object 103. In the present exemplary embodiment, the information acquisition unit 104 obtains the plurality of pieces of object information (object detailed information, object rough information, and object clue information) in one step (S202).

In step S202, when obtaining the object information, the information acquisition unit 104 scans the captured image of the target object 103 and obtains differences between the captured image and a background image to determine a difference image. The information acquisition unit 104 detects (calculates) the number $m_D$ of pixels each having a pixel luminance value greater than 0 in the difference image. The information acquisition unit 104 also obtains a normalized image of the target object 103 and performs template matching on the normalized image to determine a minimum matching error $e_{min}$. Details of the acquisition processing of the object information in step S202 (the acquisition of the difference image, the detection of the number of pixels $m_D$, and the acquisition of the normalized image) will be described below with reference to FIG. 3.

In step S203, the gripping mode selection unit 105 compares the minimum matching error $e_{min}$ obtained in step S202 with a previously-set threshold $e_{precise}$. If the minimum matching error $e_{min}$ is less than the threshold $e_{precise}$ (YES in step S203), detailed information (precise position and orientation) about the target object 103 is determined to be successfully recognized (detected) from the captured image, and the processing proceeds to step S204. If the minimum matching error $e_{min}$ is greater than or equal to the threshold $e_{precise}$ (NO in step S203), detailed information about the target object 103 is determined to be unable to be recognized (detected) from the captured image, and the processing proceeds to step S207. The comparison of the minimum matching error $e_{min}$ and the threshold $e_{precise}$ in step S203 determines whether the actually recognizable information about the target object 103 has high accuracy. To have high accuracy means that the position and orientation of the target object 103 can be identified in detail.

In step S204, the gripping mode selection unit 105 selects the detailed positioning gripping mode as the gripping mode. In the detailed positioning gripping mode, as will be described below, an intended position of the robot hand 109 is determined based on the precise position and orientation of the target object 103. In the following description, a "position and orientation" will be referred to as a "position-orientation".

In step S205, the gripping operation generation unit 106 calculates a gripping operation $O_1$ in the detailed positioning gripping mode, and outputs the gripping operation $O_1$ to the robot 107. An initial position-orientation of the robot hand 109 in the coordinate system of the camera 101 will be denoted by $R_0$, and a target position-orientation by $R_1$. The initial position-orientation $R_0$ and the target position-orientation $R_1$ are expressed by the following formula (1). The gripping operation $O_1$ can be referred to as gripping operation data.

$$\begin{cases} R_0 = \begin{pmatrix} 1 & 0 & 0 & x_0 \\ 0 & 1 & 0 & y_0 \\ 0 & 0 & 1 & z_0 \\ 0 & 0 & 0 & 1 \end{pmatrix} \\ R_1 = R_{precise} R_h = R_{precise} \begin{pmatrix} r_{h11} & x_{h21} & x_{h31} & x_h \\ r_{h12} & x_{h22} & x_{h32} & y_h \\ x_{h13} & x_{h23} & x_{h33} & z_h \\ 0 & 0 & 0 & 1 \end{pmatrix} \end{cases} \quad (1)$$

In formula (1), $R_{precise}$ represents the object detailed information (precise position-orientation of the target object 103) determined in step S202. $R_h$ represents a gripping position-orientation of the robot hand 109 with respect to a coordinate system of the target object 103. $R_h$ is the position-orientation where the target object 103 can be appropriately gripped. The position-orientation is set in terms of the coordinate system of the target object 103 in advance under the environment in which the position-orientation of the target object 103 is measured. The gripping operation $O_1$ is expressed as a set of position-orientations R linking the initial position-orientation $R_0$ and the target position-orientation $R_1$ in a time series manner. Using the initial position-orientation $R_0$ and the target position-orientation $R_1$, the gripping operation $O_1$ is given by the following formula (2).

$$\begin{cases} O_1 = \{R_0, R_{01}, R_{02}, \ldots, R_{0l-1}, R_{0l}, R_1\} \\ R_{0j} = R_0 \frac{l-j}{l} + R_1 \frac{j}{l} \quad (j = 1, 2, \ldots l) \end{cases} \quad (2)$$

Here, "l" represents the number of divisions between the initial position-orientation $R_0$ and the target position-orientation $R_1$. Each position-orientation R is expressed by a 4×4 matrix. The interpolation calculation of the actual orientation in formula (2) is performed by using quaternion expressions to maintain orthonormality.

In such a manner, the gripping operation generation unit 106 generates the gripping operation data defining the gripping operation of the robot 107 by using the object detailed information $R_{precise}$ that is object information obtained by the information acquisition unit 104 and corresponds to the gripping mode selected by the gripping mode selection unit 105. In step S206, the robot 107 executes the gripping operation $O_1$ generated by the gripping operation generation unit 106 to grip the target object 103. If the robot 107 grips the target object 103, this process ends. After gripping the target object 103, the robot 107 assembles the target object 103 to a predetermined position (area).

If the minimum matching error $e_{min}$ is greater than or equal to the threshold $e_{precise}$ (NO in step S203), then in step S207, the gripping mode selection unit 105 compares the minimum matching error $e_{min}$ determined in step S202 with a previously-set second threshold $e_{rough}$. If the minimum matching error $e_{min}$ is less than the second threshold $e_{rough}$ (YES in step S207), the gripping mode selection unit 105 determines that rough information about the target object 103 is successfully recognized (detected) from the captured image. Then, the processing proceeds to step S208. If the minimum matching error $e_{min}$ is greater than or equal to the second threshold $e_{rough}$ (NO in step S207), the gripping mode selection unit 105 determines that rough information about the target object 103 (rough position-orientation of the target object 103) is not able to be recognized or detected from the captured image. The processing proceeds to step S210.

In step S208, the gripping mode selection unit 105 selects the rough positioning gripping mode as the gripping mode. In the rough positioning gripping mode, as will be described below, the intended position of the robot hand 109 is determined based on the rough position-orientation of the target object 103.

In step S209, the gripping operation generation unit 106 calculates a gripping operation $O_2$ in the rough positioning gripping mode, and outputs the gripping operation $O_2$ to the robot 107. The target position-orientation in the coordinate system of the camera 101 will be denoted by $R_2$. The target position-orientation $R_2$ is expressed by the following formula (3).

$$\begin{cases} R_2 = R_{estimate}R_h \\ R_{estimate} = R_{rough}R_v = R_{rough}\begin{pmatrix} \cos\lambda & \sin\lambda & 0 & x_v \\ -\sin\lambda & \cos\lambda & 0 & y_v \\ 0 & 0 & 1 & z_v \\ 0 & 0 & 0 & 1 \end{pmatrix} \\ x_v = \alpha x_{rand} \\ y_v = \alpha y_{rand} \quad (0 \le x_{rand}, y_{rand}, z_{rand}, \lambda_{rand} \le 1) \\ z_v = \alpha z_{rand} \\ \lambda = \beta \lambda_{rand} \end{cases} \quad (3)$$

$R_{rough}$ represents the object rough information (position-orientation of the target object 103 with a range) determined in step S202. α and β represent weighting factors for variations in position and orientation, respectively, which will be described below. $x_{rand}$, $y_{rand}$, $z_{rand}$, and $\lambda_{rand}$ represent random real numbers each having an arbitrary value of 0 to 1. $R_{rough}$ of formula (3) in this step S209 is not object information more precise than $R_{precise}$ of formula (1). In the present exemplary embodiment, if the object rough information $R_{rough}$ is used, the target position-orientation $R_2$ is therefore determined with predetermined variations given by $R_v$ to prevent acquisition of an erroneous gripping position. The gripping operation $O_2$ is generated as a set of position-orientations R linking the initial position-orientation $R_0$ and the target position-orientation $R_2$ in a time series manner. The gripping operation $O_2$ is generated by replacing $R_1$ in formula (2) with $R_2$. After step S209, the processing proceeds to step S206. In step S206, the robot 107 executes the gripping operation $O_2$ generated by the gripping operation generation unit 106 to grip the target object 103.

If the minimum matching error $e_{min}$ is greater than or equal to the second threshold $e_{rough}$ (NO in step S207), then in step S210, the gripping mode selection unit 105 compares the number of pixels $m_D$ (the number of pixels each having a luminance value greater than 0 in the difference image D) and a previously-set pixel number threshold $m_{clue}$. If the number of pixels $m_D$ is greater than or equal to the pixel number threshold $m_{clue}$ (YES in step S210), the gripping mode selection unit 105 determines that clue information about the target object 103 (position range in which the target object 103 exists) is successfully detected. Then, the processing proceeds to step S211. If the number of pixels $m_D$ is less than the pixel number threshold $m_{clue}$ (NO in step S210), the gripping mode selection unit 105 determines that clue information about the target object 103 is not able to be detected. Then, the processing proceeds to step S213.

In step S211, the gripping mode selection unit 105 selects the position range specification gripping mode as the gripping mode. In the position range specification gripping mode, as will be described below, the intended position of the robot hand 109 is determined based on the position range (region) in which the target object 103 exists, obtained from the object clue information.

In step S212, the gripping operation generation unit 106 calculates a gripping operation $O_3$ in the position range specification gripping mode, and outputs the gripping operation $O_3$ to the robot 107. The target position-orientation in the coordinate system of the camera 101 will be denoted by $R_3$. The target position-orientation $R_3$ of the robot hand 109 is expressed by the following formula (4).

$$\begin{cases} R_3 = \begin{pmatrix} 1 & 0 & 0 & x_{R3} \\ 0 & 1 & 0 & y_{R3} \\ 0 & 0 & 1 & z_{R3} \\ 0 & 0 & 0 & 1 \end{pmatrix} \\ x_{R3} = x_u + x_{R3rand}\delta x \quad (-1 \le x_{R3rand}, y_{R3rand} \le 1) \\ y_{R3} = y_u + y_{R3rand}\delta y \\ z_{R3} = z_{fix} \end{cases} \quad (4)$$

Figure 3:
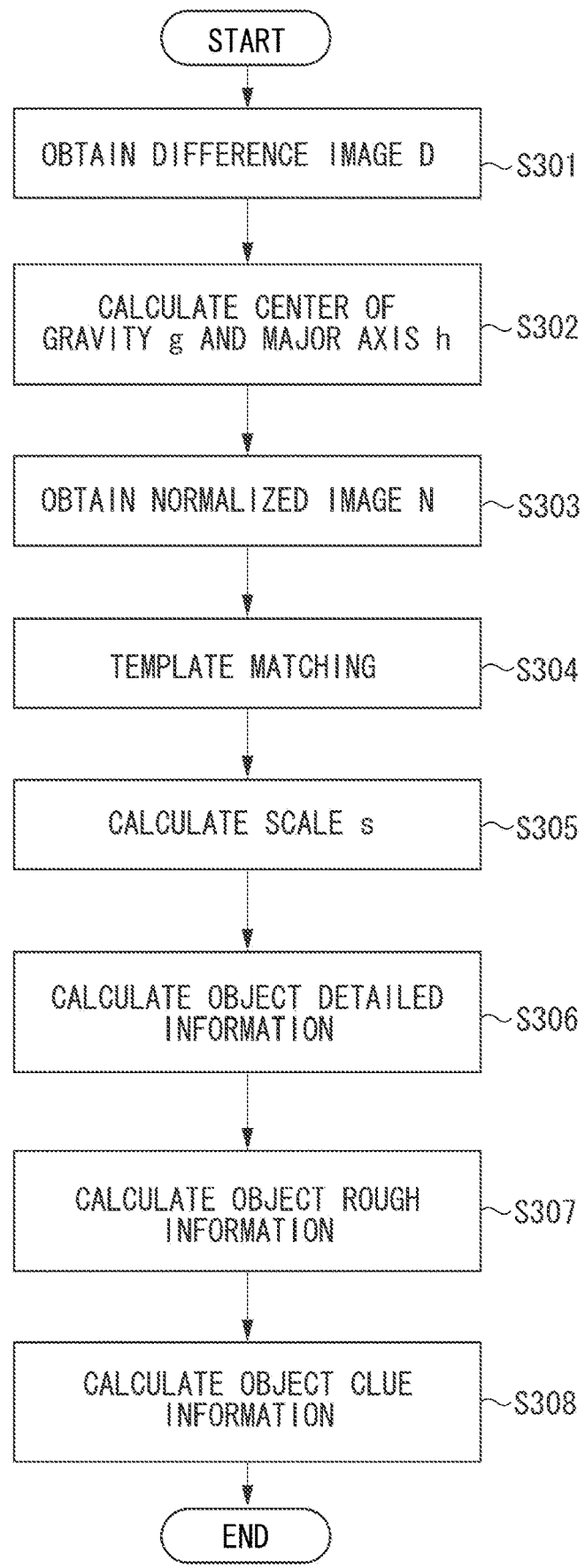
FIG. 3 is a flowchart illustrating details of an object information acquisition step according to the first exemplary embodiment.

$x_u$, $y_u$, δx, and δy will be described below with reference to FIG. 3. $x_{R3rand}$ and $y_{R3rand}$ represent random real numbers each having an arbitrarily value of −1 to 1. $z_{fix}$ represents a previously-set fixed value of an appropriate height of the robot hand 109 to grip the target object 103 on the belt conveyor 102. In step S212, the gripping operation generation unit 106 generates the target position-orientation $R_3$ by randomly specifying a position within a position range $u(x_u \pm \delta x, y_u \pm \delta y)$ of the target object 103 obtained from the object clue information. The gripping operation $O_3$ is generated as a set of position-orientations R linking the initial position-orientation $R_0$ and the target position-orientation $R_3$ in a time series manner. The gripping operation $O_3$ is generated by replacing $R_1$ in formula (2) with $R_3$. After step S212, the processing proceeds to step S206. In step S206, the robot 107 executes the gripping operation $O_3$ generated by the gripping operation generation unit 106 to grip the target object 103.

If the number of pixels $m_D$ is less than the pixel number threshold $m_{clue}$ (NO in step S210), then in step S213, the gripping mode selection unit 105 selects the random gripping mode as the gripping mode. In the random gripping mode, as will be described below, the intended position of the robot 107 (the destination position of the robot hand 109) is determined without using object information.

In step S214, the gripping operation generation unit 106 calculates a gripping operation $O_4$ in the random gripping mode, and outputs the gripping operation $O_4$ to the robot 107. The target position-operation in the coordinate system of the camera 101 will be denoted by $R_4$. The target position-orientation $R_4$ of the robot hand 109 is expressed by the following formula (5):

$$\begin{cases} R_4 = \begin{pmatrix} 1 & 0 & 0 & x_{R4} \\ 0 & 1 & 0 & y_{R4} \\ 0 & 0 & 1 & z_{R4} \\ 0 & 0 & 0 & 1 \end{pmatrix} \\ x_{R4} = x_{R4rand} \quad (x_{conveyor\ min} \le x_{R4rand} \le x_{conveyor\ max}) \\ y_{R4} = y_{R4rand} \quad (y_{conveyor\ min} \le y_{R4rand} \le y_{conveyor\ max}) \\ z_{R4} = z_{fix} \end{cases} \quad (5)$$

$x_{R4rand}$ and $y_{R4rand}$ represent random real numbers each having an arbitrary value within a range of $x_{conveyor\ min}$ to $x_{conveyor\ max}$ in the x direction and a range of $y_{conveyor\ min}$ to $y_{conveyor\ max}$ in the y direction, respectively, in which the belt conveyor 102 serving as the supply unit exists. In the present step (S214), the gripping operation generation unit 106 does not use the position-orientation of the target object 103. The gripping operation generation unit 106 generates the target position-orientation $R_4$ by randomly specifying a position within the range of the entire supply unit (within the range of the belt conveyor 102 of FIG. 1 and inside the imaging range 112 of the camera 101). The gripping operation $O_4$ is generated as a set of position-orientations R linking the initial position-orientation $R_0$ and the target position-orientation $R_4$ in a time series manner. The gripping operation $O_4$ is generated by replacing $R_1$ in formula (2) with $R_4$. After step S214, the processing proceeds to step S206. In step S206, the robot 107 executes the gripping operation $O_4$ generated by the gripping operation generation unit 106 to grip the target object 103.

As described above, the operation of steps S201 to S214 can be performed to appropriately grip the target object 103 with the robot 107. After gripping the target object 103, the robot 107 assembles the target object 103 to a predetermined position (area).

<Object Information Acquisition Processing>

Next, details of the object information acquisition processing in step S202 will be described referring to the flowchart in FIG. 3. The flowchart of FIG. 3 will be described with reference to FIGS. 4A to 8C. The steps (S301 to S308) illustrated in FIG. 3 are executed by the information acquisition unit 104.

In step S301, the information acquisition unit 104 scans the captured image and calculates differences from the background image to obtain a difference image D.

Figure 4A:
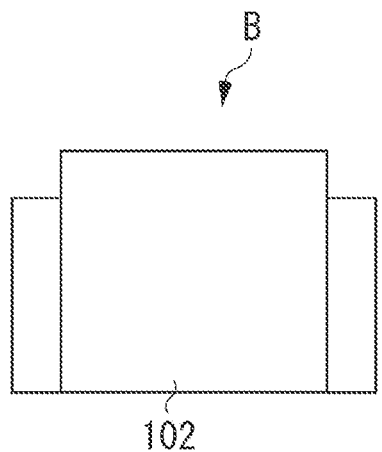
FIGS. 4A, 4B, and 4C are diagrams illustrating a background image, a captured image, and a difference image according to the first exemplary embodiment.
Figure 4B:
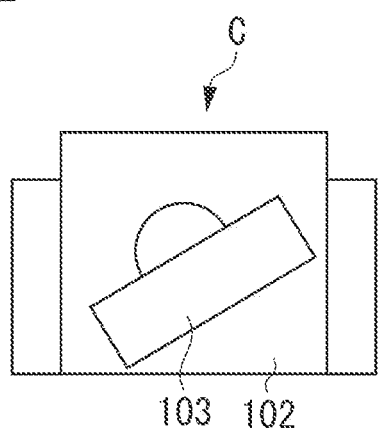
Figure 4C:
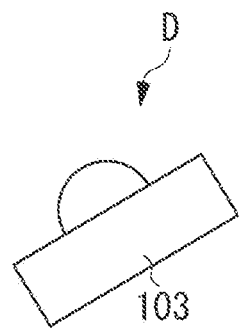

FIGS. 4A to 4C are diagrams illustrating the acquisition of the difference image D. As illustrated in FIG. 4A, a background image B captured without the presence of the target object 103 is generated (prepared) in advance. The background image B is an image of the top portion of the belt conveyor 102 in FIG. 1. FIG. 4B illustrates a currently captured image C. Therefore, the image captured in the state of FIG. 1 is the captured image C. The target object 103 is placed on the belt conveyor 102. FIG. 4C illustrates the difference image D. The difference image D can be determined by obtaining differences between the background image B and the captured image C as expressed by formula (6) to extract only pixels representing the target object 103.

$$\begin{cases} I_d = |I_b - I_c| & (|I_b - I_c| > I_t) \\ I_d = 0 & (|I_b - I_c| \le I_t) \end{cases} \quad (6)$$

Here, $I_b$, $I_c$, and $I_d$ represent the luminance values of pixels constituting the background image B, the captured image C, and the difference image D, respectively. $I_t$ represents a threshold of a luminance difference used to obtain the difference image D. The information acquisition unit 104 scans the entire captured image and thereby applies the calculation of formula (6) to all the pixels of the captured image C to obtain the difference image D.

Figure 5:
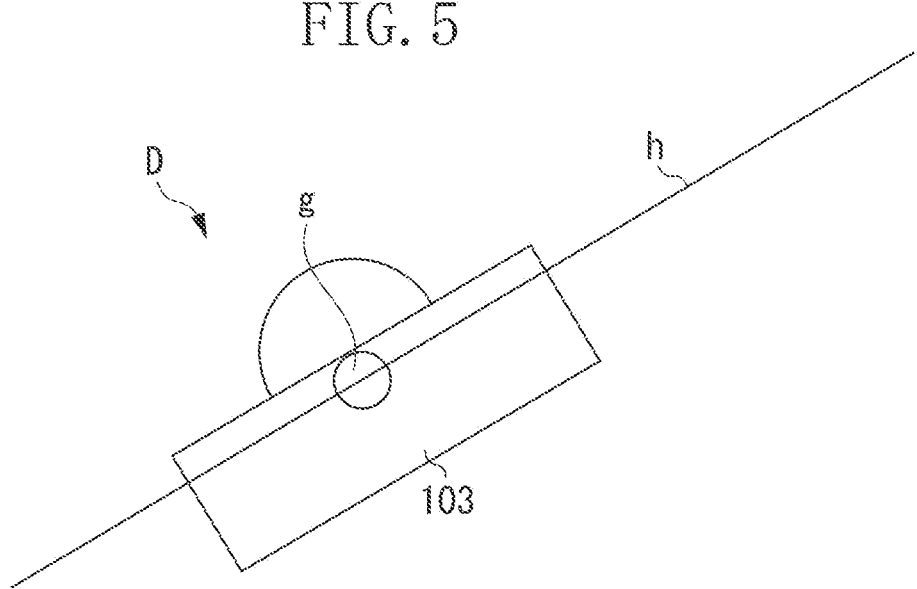
FIG. 5 is a diagram illustrating a center of gravity and a major axis of the target object in the difference image.

FIG. 5 is a diagram illustrating a center of gravity g of the target object 103 in the difference image D and a straight line h indicating the direction of a long side of the target object 103. The straight line h passes through the center of gravity g of the target object 103. The straight line h can be referred to as a major axis of the target objet 103.

In step S302, the information acquisition unit 104 calculates the center of gravity $g(x_g, y_g)$ and the major axis h which define the position of the target object 103 in the captured image. FIG. 5 illustrates the center of gravity $g(x_g, y_g)$ and the major axis h of the target object 103 in the difference image D. The center of gravity g of the target object 103 is expressed by the following formula (7).

$$g = \frac{1}{m_D} \sum_D (x_d, y_d) \quad (I_d > 0) \quad (7)$$

$x_d$ and $y_d$ represent the positions (x-coordinate position and y-coordinate position) of a pixel d having a luminance value greater than 0 in the difference image D. $m_D$ represents the number of such pixels. The straight line h serving as the major axis is expressed by the following formula (8). The horizontal direction of FIG. 5 is the x direction, and the vertical direction is the y direction.

$$\begin{cases} h(x) = ax + b \\ a = \dfrac{m_D \sum_D x_d y_d - \sum_D x_d \sum_D y_d}{m_D \sum_D x_d^2 - \left(\sum_D x_d\right)^2} \quad (I_d > 0) \\ b = \dfrac{\sum_D x_d^2 \sum_D y_d - \sum_D x_d y_d \sum_D x_d}{m_D \sum_D x_d^2 - \left(\sum_D x_d\right)^2} \end{cases} \quad (8)$$

Figure 6:
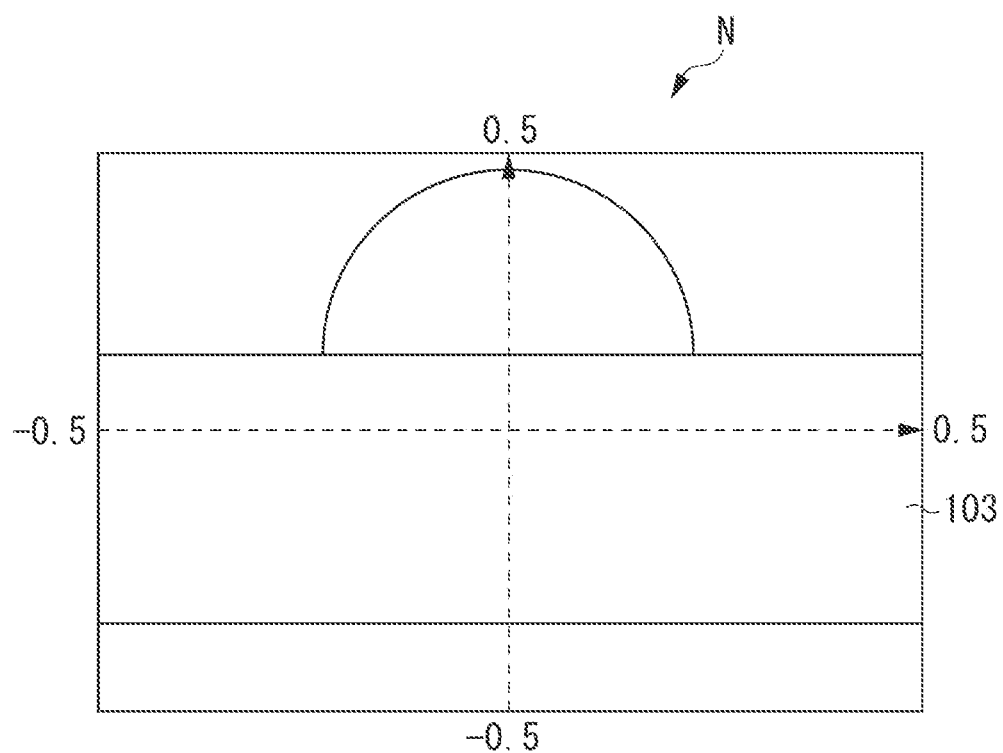
FIG. 6 is a diagram illustrating a normalized image according to the first exemplary embodiment.

In step S303, the information acquisition unit 104 normalizes pixel positions, rotation, and a scale of the difference image D to enable recognition of the target object 103 by template matching. The information acquisition unit 104 thereby obtains a normalized image N illustrated in FIG. 6. The horizontal direction of FIG. 6 is the x direction, and the vertical direction is the y direction. Each pixel $n(x_n, y_n)$ constituting the normalized image N is expressed by the following formula (9).

$$\begin{cases} n = \begin{pmatrix} x_n \\ y_n \\ 1 \end{pmatrix} = s_d R_{2D} \begin{pmatrix} x_d \\ y_d \\ 1 \end{pmatrix} \\ R_{2D} = \begin{pmatrix} \cos\theta & \sin\theta & -x_g \\ -\sin\theta & \cos\theta & -y_g \\ 0 & 0 & 1 \end{pmatrix} \quad (I_d > 0) \\ \theta = \arctan\alpha \\ s_d = \dfrac{1}{x_{d\,max} - x_{d\,min}} \end{cases} \quad (9)$$

$x_{dmax}$ and $x_{dmin}$ represent a maximum value and a minimum value, respectively, among all $x_d$'s of pixels d each having a luminance value greater than 0 in the difference image D. The information acquisition unit 104 obtains the normalized image N by applying formula (9) to all the pixels d each having a luminance value greater than 0.

Figure 7A:
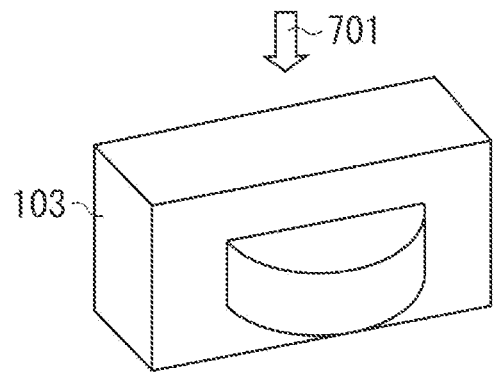
FIGS. 7A, 7B, and 7C are diagrams illustrating three types of arrangement orientations of the target object according to the first exemplary embodiment.
Figure 7B:
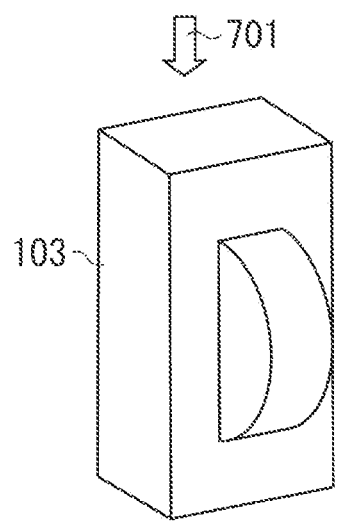
Figure 7C:
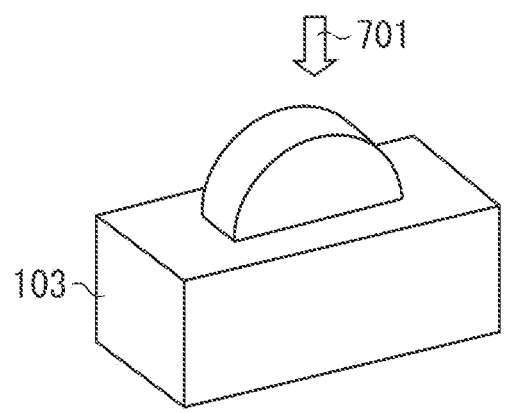
Figure 8A:
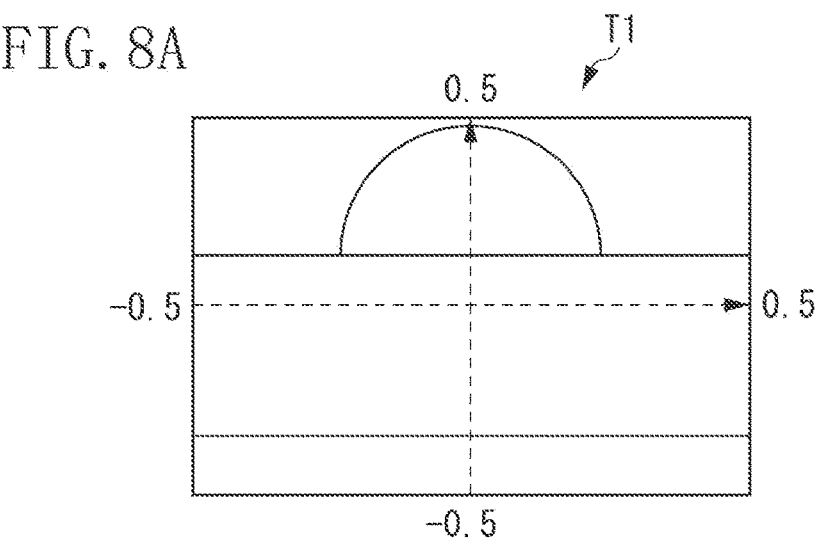
FIGS. 8A, 8B, and 8C are diagrams illustrating three templates respectively corresponding to the three types of arrangement orientations of FIGS. 7A, 7B, and 7C.
Figure 8B:
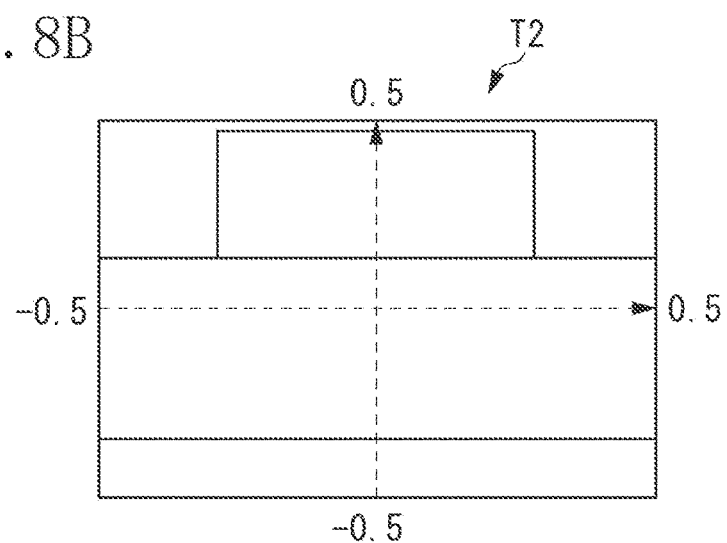
Figure 8C:
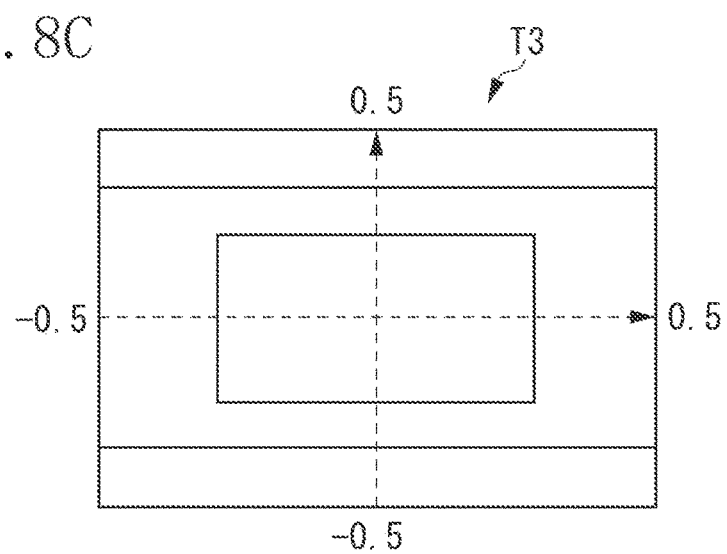

In step S304, the information acquisition unit 104 performs template matching on the normalized image N to recognize an arrangement orientation of the current target object 103. In the present exemplary embodiment, as illustrated in FIGS. 7A, 7B, and 7C, the target object 103 has three types of arrangement orientations. The three types of arrangement orientations are previously observed from above (in the direction of the arrow 701 in FIGS. 7A to 7C) to generate normalized images N by a procedure similar to that of steps S301 to S303. The normalized images N are used as templates $T_1$ to $T_3$ of the respective orientations. FIGS. 8A, 8B, and 8C illustrate the templates $T_1$, $T_2$, and $T_3$ corresponding to FIGS. 7A, 7B, and 7C, respectively. Using the templates $T_1$, $T_2$, and $T_3$, the information acquisition unit 104 performs template matching by the following formula (10).

$$e_k = \frac{1}{m_N} \sum |I_{tk} - I_n| \quad (k = 1, 2, 3) \tag{10}$$

$I_n$ represents the luminance value of each pixel in the normalized image N. $I_{tk}$ represents the luminance value of each pixel in a template $T_k$. $M_N$ represents the total number of pixels of the normalized image N. $e_k$ represents a matching error with respect to the template $T_k$. The information acquisition unit 104 selects a minimum matching error $e_{min}$ from among the determined matching errors $e_1$ to $e_3$, and outputs a matching result by using the template $T_k$ corresponding to the minimum matching error $e_{min}$. In step S305, the information acquisition unit 104 calculates a scale s of the target object 103 in the captured image with respect to the template $T_k$ corresponding to the minimum matching error $e_{min}$. The scale s is determined by the following formula (11).

$$s = \frac{s_d}{s_{e\,min}} \tag{11}$$

$s_d$ is the numerical value obtained by formula (9) in step S303. $s_{emin}$ is a numerical value equivalent to $s_d$ that is obtained when the template $T_k$ corresponding to the minimum matching error $e_{min}$ is calculated in advance.

In step S306, the information acquisition unit 104 calculates and outputs $R_{precise}$ representing the three-dimensional position-orientation of the target object 103 as the object detailed information. $R_{precise}$ is obtained by the following formula (12).

$$\begin{cases} R_{precise} = \begin{pmatrix} \cos\theta & \sin\theta & 0 & x_p \\ -\sin\theta & \cos\theta & 0 & y_p \\ 0 & 0 & 1 & z_p \\ 0 & 0 & 0 & 1 \end{pmatrix} \\ x_p = \frac{x_d z_p}{f} \\ y_p = \frac{y_d z_p}{f} \\ z_p = s z_{tk} \end{cases} \tag{12}$$

f represents a focal length of the camera 101. $Z_{tk}$ represents a z-direction position (z-coordinate position) of the target object 103 when the template $T_k$ corresponding to the minimum matching error $e_{min}$ is captured. The focal length f is obtained in advance by performing calibration of the camera 101. $z_{tk}$ is obtained in advance by actual measurement when the template $T_k$ is captured. In step S307, the information acquisition unit 104 calculates and outputs $R_{rough}$ representing the three-dimensional position-orientation of the target object 103 with a range as the object rough information. $R_{rough}$ is obtained by the following formula (13).

$$\begin{cases} R_{rough} = \begin{pmatrix} \cos\gamma & \sin\gamma & 0 & x_r \\ -\sin\gamma & \cos\gamma & 0 & y_r \\ 0 & 0 & 1 & z_r \\ 0 & 0 & 0 & 1 \end{pmatrix} \\ x_r = x_p & (x_p - \alpha e_{min} \le x_r \le x_p + \alpha e_{min}) \\ y_r = y_p & (y_p - \alpha e_{min} \le y_r \le y_p + \alpha e_{min}) \\ z_r = z_p & (z_p - \alpha e_{min} \le z_r \le z_p + \alpha e_{min}) \\ \gamma = \theta \pm \beta e_{min} & (\theta - \beta e_{min} \le \gamma \le \theta + \beta e_{min}) \end{cases} \tag{13}$$

α represents a weighting factor for associating variations in the three-dimensional position of the target object 103 with the minimum matching error $e_{min}$. β is a weighting factor for associating variations in a z-axis rotation direction with the minimum matching error $e_{min}$. The factors α and β are set in advance by performing template matching with the target object 103 arranged in various positions and orientations, and determining numerical changes between the minimum matching error $e_{min}$ and variations in position and orientation. In step S308, the information acquisition unit 104 calculates and outputs a position range u representing the range of presence of the target object 103 as the object clue information. The position range u is obtained by the following formula (14).

$$\begin{cases} u = (x_u, y_u) = (x_g \pm \delta x, y_g \pm \delta y) \\ \delta x = \frac{x_{d\,max} - x_{d\,min}}{2} \\ \delta y = \frac{y_{d\,max} - y_{d\,min}}{2} \end{cases} \tag{14}$$

$y_{dmax}$ and $y_{dmin}$ represent a maximum value and a minimum value, respectively, among all $y_d$'s of pixels each having a luminance value greater than 0 in the difference image D.

By controlling the gripping operation of the robot 107 as described above, the robot control apparatus 114 of the present exemplary embodiment can select a gripping mode according to the accuracy (imaging accuracy) of information about the target objet 103 obtained from the captured image and grip the target object 103. Even if detailed (precise) information about the target object 103 is not able to be obtained under adverse conditions, the success rate of gripping of the target object 103 can be increased.

In the present exemplary embodiment, for example, in a case where the robot 107 performs an operation to fit the target object 130 into a specific position, if the object detailed information about the target object 103 is successfully obtained (recognized) (YES in step S203), the robot control apparatus 114 selects the detailed positioning gripping mode. This enables a quick fitting operation of the target object 103. Since the detailed (precise) position and orientation of the target object 103 are successfully recognized, the target object 103 will not be re-gripped. If the object detailed information about the target object 103 is not able to be recognized (detected) and the object rough information is successfully detected (YES in step S207), the robot control apparatus 114 selects the rough positioning gripping mode to grip the target object 103. In such a case, the robot 107 grips the target object 103 with the robot hand 109, and transfers the target object 103 to another place (for example, a placing table for re-gripping). The robot 107 then places the target object 103 on the placing table and re-grips the target object 103. After the re-gripping, the robot 107 performs the operation to fit in the target object 103. For example, a device capable of imaging a detailed position and orientation of the target object 103 is arranged near the placing table. After the detailed position and orientation of the target object 103 are detected, the robot 107 can quickly grip the target object 103. If the object detailed information and the object rough information about the target object 103 are not able to be detected and the object clue information is successfully detected (YES in step S210), the robot control apparatus 114 selects the position range specification gripping mode for gripping. In this case, the robot 107 grips the target object 103 with the robot hand 109 and transfers the target object 103 to the placing table for re-gripping. The robot 107 then places the target object 103 on the placing table and re-grips the target object 103. After the re-gripping, the robot 107 performs the operation to fit in the target object 103. In such a manner, even if the position-orientation of the target object 103 is unable to be properly recognized, the robot 107 can perform the fitting operation without an abnormal stop. Therefore, the success rate of gripping of the target object 103 can thus be increased.

Conventional robot apparatuses recognize (detect) a detailed position-orientation of a target object by using a captured image from a camera, and perform gripping of the target object based on the detailed position-orientation of the target object. If the imaging environment or the recognition condition (state) of the target object is poor, the precise (detailed) position-orientation can fail to be recognized and the target object may be unable to be gripped. In contrast, according to the present exemplary embodiment, the robot system performs the processing for obtaining not only the object detailed information corresponding to the detailed position-orientation of the target objet 103 but also the object rough information indicating a rough position-orientation and the object clue information serving as a clue of presence of the target object 103 at the same time (in one step S202). The robot system then selects a gripping mode based on the captured image of the target object 103 (based on the accuracy of actually-recognizable information about the target object 103), and grips the target object 103 by using the object information corresponding to the gripping mode. Even if the detailed information about the target object 103 is unable to be obtained under adverse conditions, the success rate of gripping of the target object 103 can thus be increased.

In the above-described description, the camera 101, the information acquisition unit 104, the gripping mode selection unit 105, the gripping operation generation unit 106, and the robot 107 are described to be connected in a wired manner by the line 110. However, the components can be connected wirelessly.

The present invention can be implemented in various modes other than the above-described first exemplary embodiment. In the first exemplary embodiment, the information acquisition unit 104 performs the processing for obtaining the three types of object information (object detailed information, object rough information, and object clue information) in one step (S202). In the first exemplary embodiment, after the object information acquisition processing (step S202), the gripping mode selection unit 105 selects (determines) a gripping mode based on the accuracy (imaging accuracy) of actually recognized information about the target object 103. In a second exemplary embodiment, the information acquisition unit 104 obtains one type of object information in one step. More specifically, in the second exemplary embodiment, the processing load of the information acquisition unit 104 in one step is reduced. This can speed up the operation (operation of the entire robot system) when the detailed positioning gripping mode is selected, in which the shortest operation is achieved.

The robot system used in the second exemplary embodiment has a configuration similar to that described in the first exemplary embodiment (FIGS. 1A and 1B). In the following description, the same reference numerals as in the first exemplary embodiment will thus be used. In the second exemplary embodiment, the camera 101 similarly captures an image of a target object 103. The information acquisition unit 104 obtains object information about the target object 103 by using the captured image. Then, the robot 107 grips the target object 103.

FIG. 9 is a flowchart illustrating the processing of the robot control apparatus 114 according to the present exemplary embodiment. An operation will be described below according to the steps of FIG. 9.

In step S901, the camera 101 captures an image of the target object 103 from above to obtain a captured image of the target object 103. The processing in step S901 is similar to that in step S201 of the first exemplary embodiment. A detailed description thereof will thus be omitted.

In step S902, the information acquisition unit 104 obtains object detailed information by using the captured image obtained in step S901. The information acquisition unit 104 obtains the object detailed information by a procedure similar to that of steps S301 to S306 (FIG. 3) according to the first exemplary embodiment. As in the first exemplary embodiment (steps S301 and S304), the information acquisition unit 104 obtains a difference image D and a minimum matching error $e_{min}$.

In step S903, the gripping mode selection unit 105 compares the minimum matching error $e_{min}$ obtained in step S902 with a previously-set first threshold $e_{precise}$. If the minimum matching error $e_{min}$ is less than the first threshold $e_{precise}$ (YES in step S903), detailed information (precise position and orientation) about the target object 103 is determined to be successfully recognized from the captured image. Then, the processing proceeds to step S904. If the minimum matching error $e_{min}$ is greater than or equal to the first threshold $e_{precise}$ (NO in step S903), detailed information about the target object 103 is determined to have failed to be recognized (detected). Then, the processing proceeds to step S907.

In steps S904 to S906, the gripping mode selection unit 105 selects the gripping mode, the gripping operation generation unit 106 generates a gripping operation, and the robot 107 performs an object gripping operation. The processing of steps S904 to S906 is similar to that of steps S204 to S206 according to the first exemplary embodiment. Therefore, a description thereof will be omitted.

If the minimum matching error $e_{min}$ is greater than or equal to the first threshold $e_{precise}$ (NO in step S903), then in step S907, the information acquisition unit 104 obtains object rough information by using the captured image obtained in step S901. The information acquisition unit 104 obtains the object rough information by processing similar to that of step S307 according to the first exemplary embodiment.

In step S908, the gripping mode selection unit 105 compares the minimum matching error $e_{min}$ obtained in step S902 with the previously-set second threshold $e_{rough}$. If the minimum matching error $e_{min}$ is less than the second threshold $e_{rough}$ (YES in step S908), rough information about the target object 103 is determined to be successfully recognized (detected). Then, the processing proceeds to step S909. If the minimum matching error $e_{min}$ is greater than or equal to the second threshold $e_{rough}$ (NO in step S908), rough information about the target object 103 is determined to have failed to be recognized. Then, the processing proceeds to step S911.

In steps S909 and S910, the gripping mode selection unit 105 selects the gripping mode and the gripping operation generation unit 106 generates a gripping operation. The details of step S909 are similar to those of step S208 according to the first exemplary embodiment. The details of step S910 are similar to those of step S209 according to the first exemplary embodiment. A description thereof will thus be omitted. After step S910, the processing proceeds to step S906. In step S906, the robot 107 executes the object gripping operation.

If the minimum matching error $e_{min}$ is greater than or equal to the second threshold $e_{rough}$ (NO in step S908), then in step S911, the information acquisition unit 104 obtains object clue information by using the captured image obtained in step S901. The information acquisition unit 104 obtains the object clue information by processing similar to that of step S308 according to the first exemplary embodiment.

In step S912, the gripping mode selection unit 105 compares the number $m_D$ of pixels each having a luminance value greater than 0 in the difference image D obtained in step S902 with the pixel number threshold $m_{clue}$ which is a previously-set threshold. If the number of pixels $m_D$ is greater than or equal to the pixel number threshold $m_{clue}$ (YES in step S912), information serving as a clue of the target object 103 is determined to be successfully recognized. Then, the processing proceeds to step S913. If the number of pixels $m_D$ is less than the pixel number threshold $m_{clue}$ (NO in step S912), information serving as a clue of the target object 103 is determined to have failed to be recognized. Then, the processing proceeds to step S915.

In steps S913 and S914, the gripping mode selection unit 105 selects the gripping mode and the gripping operation generation unit 106 generates a gripping operation. The details of step S913 are similar to those of step S211 according to the first exemplary embodiment. The details of step S914 are similar to those of step S212 according to the first exemplary embodiment. Therefore, a description thereof will be omitted. After step S914, the processing proceeds to step S906. In step S906, the robot 107 executes the object gripping operation.

If the number of pixels $m_D$ is less than the pixel number threshold $m_{clue}$ (NO in step S912), then in step S915, the gripping mode selection unit 105 selects the random gripping mode. In step S916, the gripping operation generation unit 106 generates a gripping operation. The details of step S915 are similar to those of step S213 according to the first exemplary embodiment. The details of step S916 are similar to those of step S214 according to the first exemplary embodiment. A description thereof will thus be omitted. After step S916, the processing proceeds to step S906. In step S906, the robot 107 executes the object gripping operation.

In such a manner, the operation of steps S901 to S916 can be performed to grip the target object 103 with the robot 107.

In the present exemplary embodiment, the acquisition of the pieces of object information is performed sequentially (in succession, not simultaneously) by controlling the gripping operation of the robot 107 as described above. According to the sequential acquisition of the object information, for example, if the object detailed information is obtained and detailed information about the target object 103 is successfully recognized (YES in step S903), the acquisition of the object rough information (step S907) is not performed, and the acquisition of the object clue information (step S911) is not performed either. If the object rough information is obtained and rough information about the target object 103 is successfully recognized (YES in step S908), the acquisition of the object clue information (S911) is not performed. In other words, in the second exemplary embodiment, the sequential acquisition of the pieces of object information may enable acquisition of desired object information with processing load lower than that in the first exemplary embodiment. In such a case, the processing time of the information acquisition unit 104 can be reduced.

In the second exemplary embodiment, the acquisition of the pieces of object information is sequentially performed. The information acquisition unit 104 thus obtains one type of object information in one step. This reduces the processing load of one step. The processing load of one step can be reduced to reduce the processing time of the information acquisition unit 104 in one step.

The robot system of the present exemplary embodiment can obtain object information, select (determine) a gripping mode based on the captured image, and grip the target object 103. Accordingly, in addition to the effects of the first exemplary embodiment, the operation in the detailed positioning gripping mode and the rough positioning gripping mode can thus be speeded up. In particular, the present exemplary embodiment is suitable where an imaging environment of target objects 103 is favorable and the robot 107 is more likely to select the detailed positioning gripping mode.

The above-described first and second exemplary embodiments are not seen to be limiting. In the first exemplary embodiment, the information acquisition unit 104 obtains the plurality of types of object information, and the gripping mode is determined based on the accuracy of actually obtained (recognizable) information about the target object 103. Alternatively, the information acquisition unit 104 can obtain only the object detailed information, and the gripping mode can be selected based on the captured image. A robot control apparatus having such a configuration will be described as a third exemplary embodiment. The robot system used in the third exemplary embodiment has a configuration similar to that described in the first exemplary embodiment (FIGS. 1A and 1B). Accordingly, in the following description, the same reference numerals as those of the first exemplary embodiment will be used. In the third exemplary embodiment, the camera 101 similarly captures an image of the target object 103. The information acquisition unit 104 obtains object information about the target object 103 by using the captured image. Then, the robot 107 grips the target object 103. In the third exemplary embodiment, only the object detailed information is obtained, and the gripping mode is selected based on the captured image, whereby the operation of the robot 107 can be speeded up.

Figure 10:
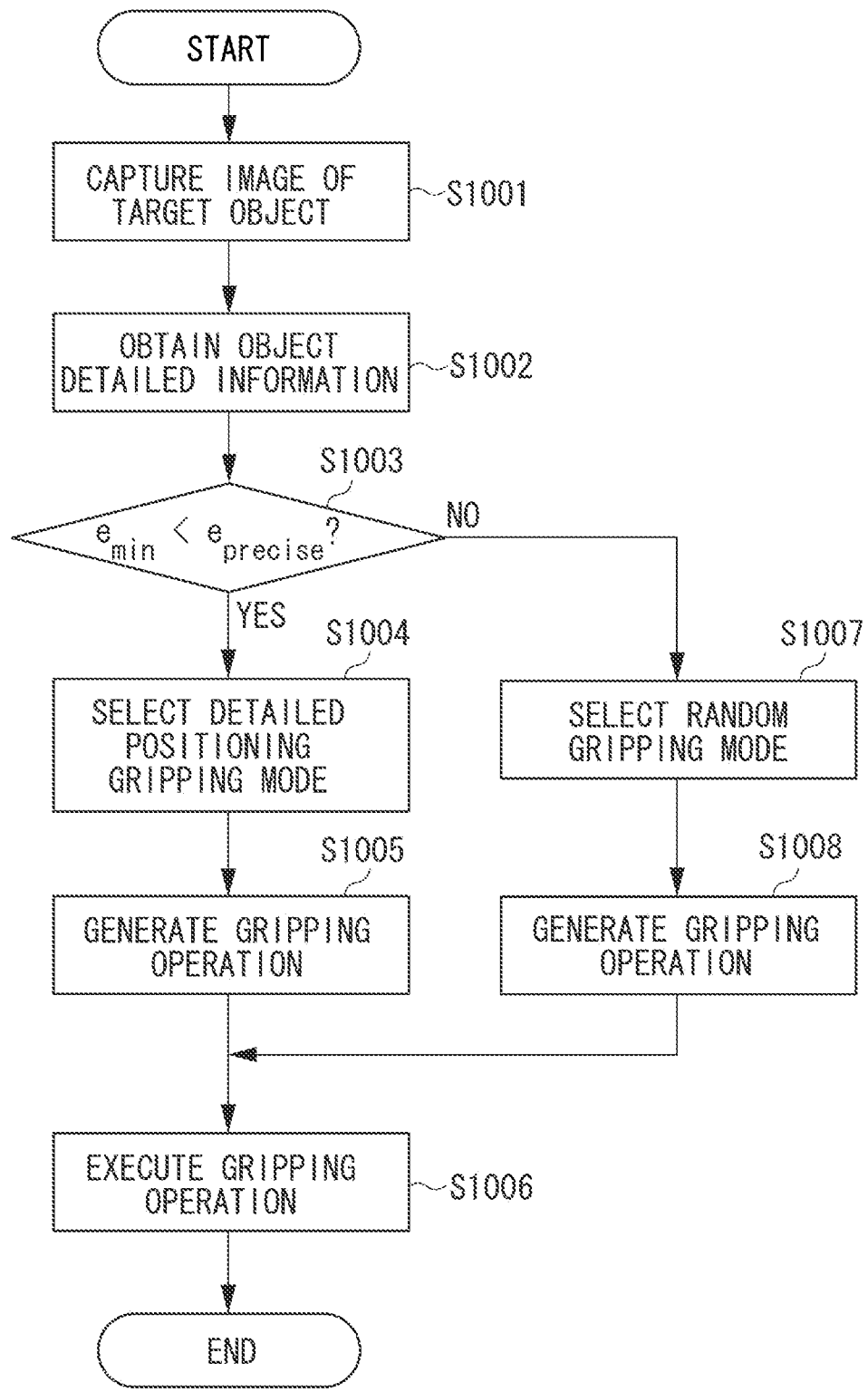
FIG. 10 is a flowchart illustrating an operation of a robot control apparatus according to a third exemplary embodiment.

FIG. 10 is a flowchart illustrating the processing of the robot control apparatus 114 according to the present exemplary embodiment. An operation will be described below according to the steps of FIG. 10.

In step S1001, the camera 101 captures an image of the target object 103 from above to obtain a captured image. The processing of step S1001 is similar to that of step S201 of the first exemplary embodiment.

In step S1002, the information acquisition unit 104 obtains object detailed information by using the captured image obtained in step S1001. More specifically, the information acquisition unit 104 performs processing similar to that of steps S301 to 306 according to the first exemplary embodiment. As in the first exemplary embodiment (step S304), the information acquisition unit 104 determines a minimum matching error $e_{min}$ at that time.

In step S1003, the gripping mode selection unit 105 compares the minimum matching error $e_{min}$ obtained in step S1002 with the previously-set threshold $e_{precise}$. If the minimum matching error $e_{min}$ is less than the threshold $e_{precise}$ (YES in step S1003), detailed information about the target object 103 is determined to be successfully recognized (obtained). Then, the processing proceeds to step S1004. If the minimum matching error $e_{min}$ is greater than or equal to the threshold $e_{precise}$ (NO in step S1003), detailed information about the target objet 103 is determined to have failed to be recognized. Then, the processing proceeds to step S1007.

In steps S1004 to S1006, the gripping mode selection unit 105 selects the gripping mode, the gripping operation generation unit 106 generates a gripping operation, and the robot 107 executes the object gripping operation. The details of steps S1004 to S1006 are similar to those of steps S204 to S206 according to the first exemplary embodiment. Therefore, a description thereof will be omitted.

If the minimum matching error $e_{min}$ is greater than or equal to the threshold $e_{precise}$ (NO in step S1003), then in step S1007, the gripping mode selection unit 105 selects the random gripping mode. In step S1008, the gripping operation generation unit 106 generates a gripping operation. The details of step S1007 are similar to those of step S213 according to the first exemplary embodiment. The details of step S1008 are similar to those of step S214 according to the first exemplary embodiment. Therefore, a description thereof will be omitted. After step S1008, the processing proceeds to step S1006. In step S1006, the robot 107 performs the object gripping operation.

In such a manner, the operation of steps S1001 to S1008 can be performed to grip the target object 103 with the robot 107.

As described above, in the present exemplary embodiment, the acquisition processing of only the object detailed information is performed. The gripping mode is selected based on the accuracy (imaging accuracy) of actually obtained information about the target object 103 (step S1003), and the gripping of the target object 103 is performed. This shortens the processing time of the information acquisition unit 104, and significantly reduces the branching of steps by the gripping mode selection unit 105 (a comparison between FIGS. 2 and 10 shows that there is no step corresponding to step S207 and S210 in FIG. 10). Therefore, in addition to the effects of the first exemplary embodiment, the processing speed of the robot control apparatus 114 and the entire operation of the robot 107 are accelerated. The present exemplary embodiment is suitable if the target object 103 is likely to grip and the robot 107 is likely to succeed in gripping even in the random gripping mode.

<Modifications>

The above-described first to third exemplary embodiments are not seen to be limiting. For example, the following modifications and additions may be made to the above-described exemplary embodiments.

(Modification Including Robot Operation Different from that in First Exemplary Embodiment)

The robot 107 according to the first exemplary embodiment is described to grip the target object 103 and then assemble the target object 103 to a predetermined position (region). However, the operation of the robot 107 is not limited thereto. For example, after gripping the target object 103 in a gripping mode selected according to the information accuracy of the captured object information, the robot 107 may change an arrangement position of the target object 103.

More specifically, if detailed information about the target object 103 is obtained (successfully recognized), the robot control apparatus 114 determines that the target object 103 is an object in a normal state, and transfers and arranges the target position 103 onto a belt conveyor for normal objects (not illustrated). If detailed information about the target object 103 is not obtained and rough information is obtained, the robot control apparatus 114 determines that the target object 13 may be defective. Then, robot control apparatus 114 transfers and arranges the target object 103 onto a belt conveyor for inspection (not illustrated) by using the robot 107. If rough information about the target object 103 is not obtained and clue information is obtained, the robot control apparatus 114 determines that the target object 103 has some kind of abnormality. Then, the robot control apparatus 114 transfers and arranges the target object 103 onto a belt conveyor for abnormal objects (not illustrated). If no clue information is obtained, the robot control apparatus 114 controls the robot 107 to transfer and arrange the target object 103 onto a belt conveyor for wastes (not illustrated). In such a manner, an operation appropriate for the state of the target object 103 can be performed by selecting a gripping mode according to the accuracy of the obtained information about the target object 103 and changing the subsequent arrangement position (transfer destination).

<Modification Using Three-Dimensional Image Sensor>

The camera 101 according to the first to third exemplary embodiments captures an image of the target object 103 from above to obtain a captured image that is an object measurement value. The camera 101 according to the above-described exemplary embodiments is thus a measurement unit. The measurement unit is not limited to the camera 101. The measurement unit can be any type of measurement unit as long as an object measurement value for calculating object information, such as a position, orientation, pixel, and luminance, about the target object 103 can be obtained. For example, a time-of-flight three-dimensional image sensor can be used as the measurement unit. The time-of-flight three-dimensional image sensor can obtain a distance value instead of pixel-by-pixel luminance values of the target object 103, as an object measurement value. The three-dimensional sensor can be used to determine a more precise position-orientation as object detailed information. The use of the three-dimensional image sensor also enables use of distance differences, not luminance differences, as object clue information.

<Modification Using Measurement Unit Other than Image Sensor>

The measurement unit of the robot control apparatus 114 or the robot system is not limited to an image sensor. For example, the measurement sensor of the robot system can measure a distance from the measurement unit and obtain an object measurement value similar to that of the above-described three-dimensional image sensor by measurement using ultrasonic waves or by contact measurement using a probe. The use of ultrasonic waves or contact measurement enables measurement not dependent on light reflectance on the surface of the target object 103. Such a measurement unit is suitable in a case of gripping a transparent target object.

<Modification Including No Detailed Positioning Gripping Mode>

The information acquisition unit 104 according to the first and second exemplary embodiments obtains the three pieces of object information (object detailed information, object rough information, and object clue information). However, depending on the shape and size of the target object 103 to be handled by the robot 107 and the intended operation of the robot 107, the information acquisition unit 104 does not always need to obtain the three pieces of object information. For example, if the target object 103 is easy to grip and the operation of the robot 107 is to simply place the gripped target object 103 flat, not to precisely assemble the gripped target object 103, the information acquisition unit 104 can obtain the simpler object rough information and object clue information without obtaining the object detailed information. Alternatively, the information acquisition unit 104 can selectively obtain either the object rough information or the object clue information according to the intended operation, without obtaining the object detailed information. In such a case, the gripping mode selection unit 105 selects the gripping mode corresponding to the object information from between the rough positioning gripping mode and the position range specification gripping mode without selecting the detailed positioning gripping mode. The gripping operation generation unit 106 generates a gripping operation accordingly. If, according to the shape and size of the target object 103 and the intended operation of the robot 107, the object detailed information is considered to be not needed, the calculation (acquisition) of the operation detailed information can be omitted to speed up the processing of the information acquisition unit 104.

To construct a robot system having such a configuration, for example, a control unit is provided between the camera 101 and the information acquisition unit 104 of FIG. 1A. Then, the control unit instructs the information acquisition unit 104 not to perform the acquisition processing of the object detailed information, based on the shape and size of the target object 103 and/or the intended operation of the robot 107. In other words, the control unit detects needless object information among the three pieces of object information. Based on the result of the detection, for example, the control unit performs control to omit the acquisition processing of the object detailed information. As a result, the processing in steps S203 to S205 of FIG. 2 is not executed. After step S202 of FIG. 2, the processing proceeds to step S207, not to step S203. The intended operation of the robot 107 is supposed to have been input to the control unit in advance.

<Modification Including Different Calculation Method for Object Detailed Information>

To calculate the object detailed information, the information acquisition unit 104 according to the first to third exemplary embodiments obtains the center of gravity g and the major axis h in the direction of the long side, performs normalization, and calculates the template matching. However, this calculation method is not seen to be limiting. Methods other than normalization processing or template matching can be used as long as a precise position-orientation of the target object 103 can be obtained. For example, if the target object 103 is close to a circular shape and the major axis of a long side is unable to be stably obtained, the image of the target object 103 becomes difficult to normalize. In such a case, an image feature amount not dependent on the rotation direction of the target object 103, such as scale-invariant feature transform (SIFT), can be detected and recorded for the sake of direct matching without performing normalization. This enables handling target objects of various shapes.

<Modification Including Different Calculation Method for Object Rough Information>

To calculate the object rough information, the information acquisition unit 104 according to the first to third exemplary embodiments multiplies the minimum matching error $e_{min}$ at the time of template matching by the weighting factors $\alpha$ and $\beta$ to give variations to the position and orientation of the target object 103. However, this calculation method is not seen to be limiting. For example, if the image of the target object 103 is difficult to normalize, the information acquisition unit 104 can randomly select a high-order matching candidate obtained by SIFT and a corresponding position-orientation. In this case, an error of the selected high-order matching result can be used as a value equivalent to the minimum matching error $e_{min}$. This enables handling target objects of an even greater variety of shapes. Further, randomly assuming the position-orientation of a high-order matching candidate can avoid the problem of continuing selecting erroneous position-orientations by using local solutions based on misrecognition.

<Modification Including Different Calculation Method for Object Clue Information>

When calculating the object clue information, the information acquisition unit 104 according to the first to third exemplary embodiments uses a region in which the difference image D exists. In another exemplary embodiment, for example, if the luminance of the background and that of the target object 103 are close, the information acquisition unit 104 can obtain the object clue information by using values such as a luminance variance value and the positions and numbers of luminance edges and luminance corners, instead of luminance differences. While the background image such as the image of the belt conveyor 102 includes uniform luminance values, the target object 103 has relatively a complicated shape and is expected to have a lot of luminance variances, luminance edges, and luminance corners. By obtaining such a position range including values that the target object 103 is expected to have, it can be the object clue information.

If the above-described three-dimensional image sensor is used, the object clue information can be obtained by using values such as a nearest neighbor distance, the position and area of a neighboring region, a distance variance value, and the positions and numbers of distance edges and distance corners other than distance differences, depending on the shape of the target object 103. While the distance from the three-dimensional image sensor to the background such as the belt conveyor 102 is uniform, the target object 103 has relatively a complicated shape and is expected to have a lot of distance variances, distance edges, and distance corners. Since the distance from the three-dimensional image sensor to the target object 103 is shorter than that from the three-dimensional image sensor to the belt conveyor 102, the target object 103 is expected to exist at the nearest neighbor position or in a neighboring region. Thus, such a position range including values that the target object 103 is expected to have can be determined as the object clue information.

Alternatively, a specific bar code attached to a position portion of the target object 103 or a pattern or shape characteristic of the target object 103 can be used as the object clue information. If the target object 103 has such specific characteristics, the object clue information can be obtained more suitably.

The information acquisition unit 104 of the robot control apparatus 114 according to the exemplary embodiments can be of any type as long as object information about the target object 103 can be calculated.

<Modification with Different Gripping Unit>

The gripping unit of the robot 107 according to the first to third exemplary embodiments is the typical two-fingered robot hand 109 illustrated in FIG. 1A. However, this type of gripping unit is not seen to be limiting. For example, the robot hand 109 can be a universal hand that can grip target objects of various shapes even in other than a specific orientation by an identical operation. An example of the universal hand is one including a thin rubber bag filled with powder. The air inside the rubber bag is sucked out by a pump to harden the rubber portion, whereby the target object 103 is gripped.

The gripping unit of the robot 107 according to the present invention can be of any type as long as the gripping unit can grip the target object 103 in an arbitrary orientation.

<Hardware Configuration>

Figure 11:
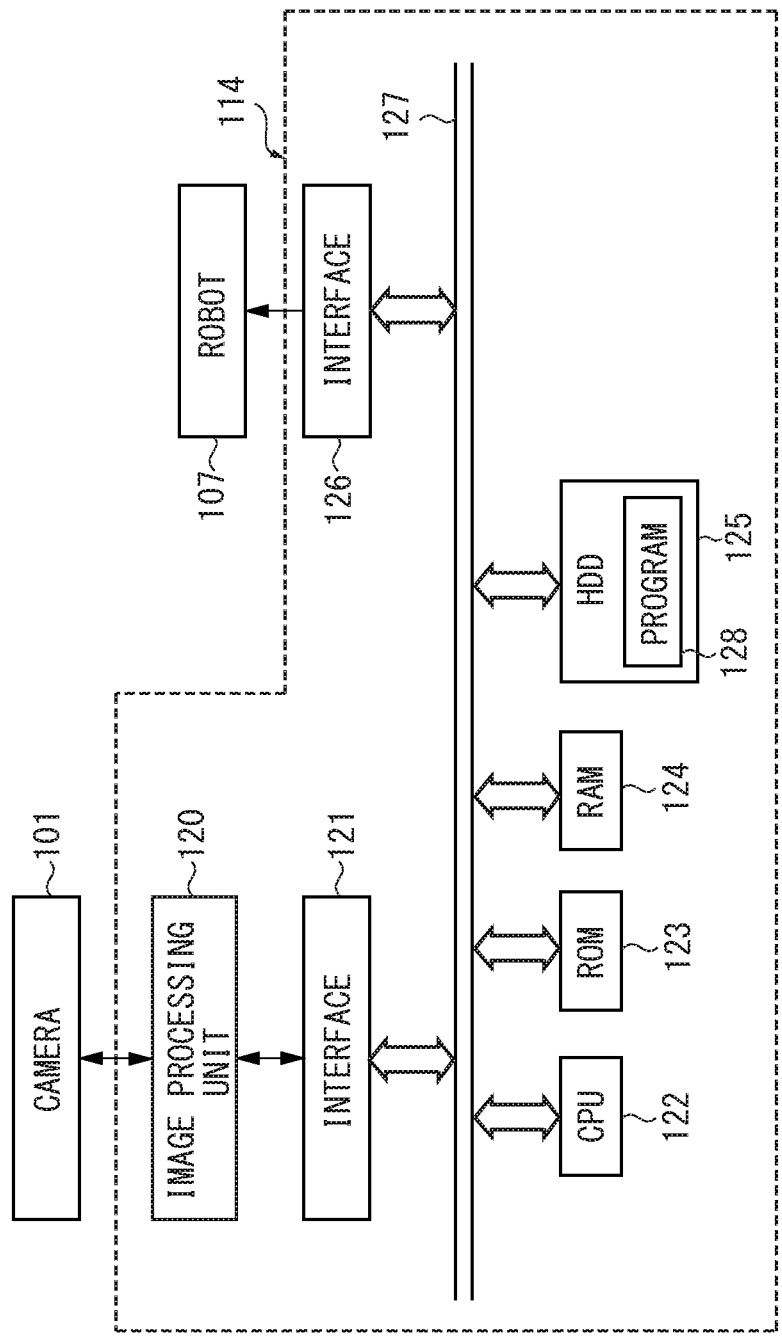
FIG. 11 is a block diagram of a robot system.

FIG. 11 is a block diagram illustrating an example of a hardware configuration of the robot system. As illustrated in FIG. 11, the robot system includes the camera 101, the robot control apparatus 114, and the robot 107. The robot control apparatus 114 includes an image processing unit 120, an interface 121, a central processing unit (CPU) 122, a read-only memory (ROM) 123, a random access memory (RAM) 124, a hard disk drive (HDD) 125, and an interface 126. The CPU 122 is an arithmetic unit of the robot control apparatus 114. The robot control apparatus 114 includes the ROM 123 and the RAM 124 as storage units. The interface 121, the CPU 122, the ROM 123, the RAM 124, the HDD 125, and the interface 126 are interconnected by a bus 127. The ROM 123 stores basic programs such as a basic input/output system (BIOS). The RAM 124 temporarily stores various types of data such as an arithmetic processing result of the CPU 122. The HDD 125 stores calculation results of the CPU 122, various types of data obtained from external to the robot system, and a program 128 for causing the CPU 122 to execute various types of arithmetic processing. The CPU 122 controls the gripping operation of the robot 107 based on the program 128 stored in the HDD 125.

The interface 121 is connected with the image processing unit 120. The image processing unit 120 performs image processing for obtaining the position and orientation of the target object 103 from a captured image input from the camera 101, and transmits the data indicating the position and orientation of the target object 103 to the CPU 122 via the interface 121 and the bus 127. The other interface 126 is connected with the robot 107. The CPU 122 calculates a gripping operation of the robot hand 109 based on the program 128 for generating gripping operation data, and transmits commands to the robot arm 108 and the robot hand 109. External storage units such as a rewritable nonvolatile memory and an external HDD can be connected to the bus 127.

<Other Modifications>

In the first and second exemplary embodiments, the robot 107 is described to include four gripping modes. In the third exemplary embodiment, the robot 107 is described to include two gripping modes. However, the number of gripping modes is not limited to two or four.

The gripping mode selection unit 105 of the robot 107 according to the exemplary embodiments can be of any type as long as a gripping mode is selected based on a captured image of the target object 103.

The gripping operation generation unit 106 of the robot control apparatus 114 according to the exemplary embodiments can be of any type as long as a gripping operation is generated according to the selected gripping mode.

The robot control apparatus 114 can include the camera 101 (or three-dimensional image sensor), the information acquisition unit 104, the gripping mode selection unit 105, and the gripping operation generation unit 106.

OTHER EMBODIMENTS

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-218215, filed Nov. 6, 2015, which is hereby incorporated by reference herein in its entirety.

What is claimed is:

1. A robot control apparatus for controlling an operation of a robot configured to grip a target object, the robot control apparatus comprising:

an acquisition unit configured to obtain information about a position and orientation of the target object from a captured image;

a selection unit configured to select one of a plurality of gripping modes based on a difference in orientation of the target object obtained by performing template matching between an image of the target object obtained from the captured image of the target object and an image of the target object registered in advance, from the plurality of gripping modes corresponding to different levels of gripping precision, such that a smaller the difference is, a higher an accuracy level of a selected gripping mode is, and that a greater the difference is, a lower the accuracy level of the selected gripping mode is; and a generation unit configured to generate gripping operation data defining a position and orientation of the robot for gripping the target object in the selected gripping mode based on the position and orientation indicated by the obtained information and the selected gripping mode, wherein the gripping operation data comprises a set of position and orientation data, the set of position and orientation data including a target position and orientation of the robot for gripping the object in the selected gripping mode.

2. The robot control apparatus according to claim 1, wherein the acquisition unit is configured to obtain the information about the position and orientation based on the captured image of the target object, and wherein the selection unit is configured to select a gripping mode corresponding to the information about the obtained position and orientation.

3. The robot control apparatus according to claim 1, wherein the acquisition unit is configured to obtain a plurality of information about positions and orientations based on the captured image of the target object, and wherein the selection unit is configured to select the gripping mode according to a type of the obtained position and orientation.

4. The robot control apparatus according to claim 3, further comprising a determination unit configured to determine information about a position and orientation to be obtained by the acquisition unit from among the plurality of types of information about the positions and orientations.

5. The robot control apparatus according to claim 1, wherein the acquisition unit is configured to obtain one type of information about position and orientation, wherein the generation unit is configured to, in a case where the selection unit successfully selects a gripping mode corresponding to the one type of information about the position and orientation, generate the gripping operation data by using the one type of information about the position and orientation, and wherein the acquisition unit is configured to, in a case where the selection unit is not able to select the gripping mode corresponding to the one type of information about the position and orientation, obtain another type of information about position and orientation.

6. The robot control apparatus according to claim 1, wherein the acquisition unit is configured to obtain one type of information about position and orientation, wherein the generation unit is configured to, in a case where the selection unit successfully selects a gripping mode corresponding to the one type of information about the position and orientation, generate the gripping operation data by using the one type of information about the position and orientation, and wherein the selection unit is configured to, in a case where the selection unit is not able to select the gripping mode corresponding to the one type of information about the position and orientation, select another gripping mode.

7. The robot control apparatus according to claim 1, further comprising a measurement unit configured to measure the target object, wherein the selection unit is configured to select the gripping mode by using a value measured by the measurement unit.

8. The robot control apparatus according to claim 1, wherein the information about the position and orientation includes information identifying the position and orientation of the target object.

9. The robot control apparatus according to claim 1, wherein the information about the position and orientation includes information indicating a possible range of positions and orientations of the target object.

10. The robot control apparatus according to claim 1, wherein the information about the position and orientation includes information indicating a presence of the target object in a predetermined region.

11. The robot control apparatus according to claim 1, wherein the selection unit is configured to, in a case where the position and orientation of the target object are successfully identified based on the captured image, select a gripping mode based on the position and orientation of the target object.

12. The robot control apparatus according to claim 1, wherein the selection unit is configured to, in a case where the position and orientation of the target object are not able to be identified and a possible range of positions and orientations of the target object is successfully detected based on the captured image, select the gripping mode based on the possible range of positions and orientations of the target object.

13. The robot control apparatus according to claim 1, wherein the generation unit is configured to, in a case where a gripping mode selected by the selection unit does not correspond to any information obtained by the acquisition unit, generate the gripping operation data without using the information about the position and orientation of the target object.

14. A robot system comprising:
a robot control apparatus for controlling an operation of a robot configured to grip a target object; and
a robot configured to grip the target object,
wherein the robot control apparatus comprises:
an acquisition unit configured to obtain information about a position and orientation of the target object from a captured image;
a selection unit configured to select one of a plurality of gripping modes based on a difference in orientation of the target object obtained by performing template matching between an image of the target object obtained from the captured image of the target object and an image of the target object registered in advance, from the plurality of gripping modes corresponding to different levels of gripping precision, such that a smaller the difference is, a higher an accuracy level of a selected gripping mode is, and that a greater the difference is, a lower the accuracy level of the selected gripping mode is; and
a generation unit configured to generate gripping operation data defining a position and orientation of the robot for gripping the target object in the selected gripping mode based on the position and orientation indicated by the obtained information and the selected gripping mode,
wherein the gripping operation data comprises a set of position and orientation data, the set of position and orientation data including a target position and orientation of the robot for gripping the object in the selected gripping mode.

15. A control method of a robot control apparatus for controlling an operation of a robot configured to grip a target object, the control method comprising:
obtaining information about a position and orientation of the target object from a captured image;
selecting one of a plurality of gripping modes based on a difference in orientation of the target object obtained by performing template matching between an image of the target object obtained from the captured image of the target object and an image of the target object registered in advance, from the plurality of gripping modes corresponding to different levels of gripping precision, such that a smaller the difference is, a higher an accuracy level of a selected gripping mode is, and that a greater the difference is, a lower the accuracy level of the selected gripping mode is; and generating gripping operation data defining a position and orientation of the robot for gripping the target object in the selected gripping mode based on the position and orientation indicated by the obtained information and the selected gripping mode, wherein the gripping operation data comprises a set of position and orientation data, the set of position and orientation data including a target position and orientation of the robot for gripping the object in the selected gripping mode.

16. A non-transitory recording medium storing computer executable instructions for causing a computer to execute a control method of a robot control apparatus for controlling an operation of a robot configured to grip a target object, the control method comprising:

obtaining information about a position and orientation of the target object from a captured image;

selecting one of a plurality of gripping modes based on a difference in orientation of the target object obtained by performing template matching between an image of the target object obtained from the captured image of the target object and an image of the target object registered in advance, from the plurality of gripping modes corresponding to different levels of gripping precision, such that a smaller the difference is, a higher an accuracy level of a selected gripping mode is, and that a greater the difference is, a lower the accuracy level of the selected gripping mode is; and generating gripping operation data defining a position and orientation of the robot for gripping the target object in the selected gripping mode based on the position and orientation indicated by the obtained information and the selected gripping mode, wherein the gripping operation data comprises a set of position and orientation data, the set of position and orientation data including a target position and orientation of the robot for gripping the object in the selected gripping mode.

17. A robot control apparatus for controlling an operation of a robot configured to grip a target object, the robot control apparatus comprising:

an acquisition unit configured to obtain information about a position and orientation of the target object from a captured image;

a selection unit configured to select one of a plurality of gripping modes based on a difference in orientation of the target object obtained by performing template matching between an image of the target object obtained from the captured image of the target object and an image of the target object registered in advance, from the plurality of gripping modes being different in where the target object is gripped, such that a smaller the difference is, a higher an accuracy level of a selected gripping mode is, and that a greater the difference is, a lower the accuracy level of the selected gripping mode is; and a generation unit configured to generate gripping operation data defining a position and orientation of the robot for gripping the target object in the selected gripping mode based on the position and orientation indicated by the obtained information and the selected gripping mode.

18. A control method of a robot control apparatus for controlling an operation of a robot configured to grip a target object, the control method comprising:

obtaining information about a position and orientation of the target object from a captured image;

selecting one of a plurality of gripping modes based on a difference in orientation of the target object obtained by performing template matching between an image of the target object obtained from the captured image of the target object and an image of the target object registered in advance, from the plurality of gripping modes being different in where the target object is gripped, such that a smaller the difference is, a higher an accuracy level of a selected gripping mode is, and that a greater the difference is, a lower the accuracy level of the selected gripping mode is; and generating gripping operation data defining a position and orientation of the robot for gripping the target object in the selected gripping mode based on the position and orientation indicated by the obtained information and the selected gripping mode.

19. A non-transitory recording medium storing computer executable instructions for causing a computer to execute a control method of a robot control apparatus for controlling an operation of a robot configured to grip a target object, the control method comprising:

obtaining information about a position and orientation of the target object from a captured image;

selecting one of a plurality of gripping modes based on a difference in orientation of the target object obtained by performing template matching between an image of the target object obtained from the captured image of the target object and an image of the target object registered in advance, from the plurality of gripping modes being different in where the target object is gripped, such that a smaller the difference is, a higher an accuracy level of a selected gripping mode is, and that a greater the difference is, a lower the accuracy level of the selected gripping mode is; and generating gripping operation data defining a position and orientation of the robot for gripping the target object in the selected gripping mode based on the position and orientation indicated by the obtained information and the selected gripping mode.

* * * * *